Patented Sept. 18, 1945

2,385,133

UNITED STATES PATENT OFFICE 2,385,133

PRODUCTION OF MOTOR FUEL

Gilmore T. Gwin, Baytown, Tex., assignor to Standard Oil Development Company, a corporation of Delaware No Drawing. Application December 18, 1942, Serial No. 469,453

3 Claims. (Cl. 260—683.4)

The present invention is directed to the production of an improved motor fuel from low boiling hydrocarbons by alkylation.

In the production of high-quality motor fuels, in particular, gasoline fuels particularly suitable for use in airplane engines, abundant use has been made of the well-known alkylation process. The alkylation process refers broadly to the reaction between an isoparaffinic hydrocarbon and an olefinic hydrocarbon, usually in the presence of a suitable catalyst, to produce an isoparaffinic hydrocarbon product which is of especial value as a constituent of aviation gasolines on account of its high resistance to motor knock and its appropriate volatility and boiling range characteristics. A well-known and widely-used example of the alkylation process is the reaction between isobutane and a butylene, such as butylene-2, using concentrated sulfuric acid as a catalyst, to produce isomeric, paraffinic octane hydrocarbons, including 2,2,4 trimethyl pentane. Instead of isobutane, other isoparaffinic hydrocarbons, such as isopentane, can be used. Pentylenes, propylene, and many other olefinic hydrocarbons can be used in place of the butylenes. A wide variety of suitable catalysts are also well-known.

The alkylation reaction, in its application to the art of petroleum refining, does not follow quantitatively the pattern of a simple stoichiometrical equation. For example, when a $C_4$ isoparaffin such as isobutane is alkylated with a $C_4$ olefin such as butylene-2, the product is not a singe isoparaffinic $C_8$ hydrocarbon, nor is it entirely an isomeric mixture of $C_8$ hydrocarbons. It has been recognized that other reactions also occur, resulting from a scission in one or more of the carbon-to-carbon linkages, to produce isoparaffinic hydrocarbon compounds other than $C_8$ hydrocarbons. These reactions may be termed fragmentation reactions. The extent to which these side reactions occur has been observed to vary with the operating conditions employed, such as temperature, ratio of reactants, and contact with catalyst, and also with the specific nature of the reactants. Many other hydrocarbons, such as isopentane and the pentylenes, have been observed to be more susceptible to producing side reactions, or fragmentation reactions, than are the $C_4$ hydrocarbons cited above.

Isobutane has been found to be the most desirable isoparaffinic hydrocarbon for use in the alkylation process hereinbefore described, on account of its inherent chemical reactivity and on account of the fact that its use results in a product of unusually high quality from the standpoint of anti-knock characteristics and boiling-point range. The butylene hydrocarbons have been found to be the most desirable olefinic hydrocarbon constituents for the alkylation reactions, largely for the same reasons. The pentylene hydrocarbons function quite satisfactorily as an olefinic feed stock for the alkylation process, and are widely used.

Recently, other important industrial uses for the isobutane and butylene hydrocarbons have been developed. For example, it has been found that these compounds can be dehydrogenated to supply suitable feed stocks for synthetic rubber manufacture. These newer developments have made it expedient to substitute other hydrocarbons for the isobutane and butylenes commonly employed in the alkylation process. The pentylene hydrocarbons are already being used to replace the butylenes as the olefinic hydrocarbon component in the alkylation process to a large degree. It would also be desirable, under certain conditions of limited availability of raw materials, to replace or augment the isobutane with another isoparaffinic hydrocarbon such as isopentane. An objection to the use of isopentane is that it does not function as well as isobutane in the alkylation reaction. For example, it has been found that when isopentane is alkylated with pentylenes, using the familiar sulfuric acid catalyst, the product is definitely inferior to that obtained with isobutane and pentylenes, with reference to subsequent use as a component of high quality aviation gasolines. It is inferior for the following principal reasons: (1) It does not have as high a resistance to motor knock; and (2) a relatively large portion of it has too high a boiling point to permit its use in high quality aviation gasolines.

It has already been suggested in the prior art to utilize the alkylation reaction to separate isopentane from refinery $C_5$ cuts containing it in association with pentylenes and normal pentane. Such a process is described and claimed in U. S. 2,264,447. The refinery $C_5$ cuts with which this patent is concerned usually contain substantial amounts of isopentane, but larger amounts of amylenes. A typical refinery $C_5$ cut, for example, might contain about 28% of isopentane and 35% of amylene. The patentee points out that, in recovering isopentane from such a fraction, another isoparaffin, such as isobutane, is added to the $C_5$ cut and the mixture subjected to alkylation. The patentee prescribes the employment of a large excess of added isoparaffin to olefin, by the maintenance of a high ratio of recycle to feed stock and a ratio of at least 2:1 and preferably to the order of 10:1 of added isoparaffin to olefin in the fresh feed. This combination of measures would normally result in the maintenance of a ratio of added isoparaffin to olefin in the actual reaction mixture considerably in excess of 10:1. This means, of course, that there would be even a greater ratio of added isoparaffin to isopentane in the reaction mixture.

The present invention is based on the discovery that when a mixture of isobutane and isopentane containing a substantial amount of isopentane, such as at least 30%, is employed in the alkylation reaction, a product is obtained which is greatly superior to that which could have been expected from the characteristics of the products obtained by alkylating these isoparaffins separately under the same conditions. Furthermore, the product obtained from the mixed isoparaffinic feed is considerably superior to that obtained by blending the products obtained by separate alkylation of the individual isoparaffins under the same conditions in the following respects: (1) The product from the mixed isoparaffinic feed has a higher octane number than the blend from the products of the individual isoparaffins. (2) The product from the mixed isoparaffinic feed contains a higher percentage of material boiling in the temperature range desirable for an aviation gasoline than the blend of the products from the individual isoparaffins. In making the latter statement, the fraction of alkylate particularly suitable for aviation gasoline has been taken to be that portion of the total depentanized alkylate boiling below 320° F.

In the blend mentioned herein above it is understood that the ratio of the two products in the blend is in the same ratio as are the quantities of the individual alkylates produced from each of the isoparaffins in the mixed feed.

The improved results which can be obtained when using a mixed isoparaffinic feed stock in accordance with the present invention, may be illustrated by the following results of runs using as the isoparaffinic feed stock respectively (1) isobutane, (2) isopentane, (3) a mixture of isobutane and isopentane in equal molar ratio. A pentane-pentylene stock was used as the olefin feed stock in each run. The same operating conditions were used in each run and were as follows: volume ratio of isoparaffins to olefins, 7:1; temperature 40° F.; catalyst, 96% commercial black sulfuric acid; ½ volume of acid per volume of total hydrocarbon; average time of contact, one hour. It may be observed that these runs were made in a system operating on the emulsion-type principle well known in the literature. The pertinent results of these runs were as follows:

| Isoparaffin stock used | Inspections on IBP—320° F. fraction of depentanized alkylate product | |
|---|---|---|
| | ASTM octane No. | Volume per cent of total alkylate |
| Isobutane | 91.0 | 93.9 |
| Isopentane | 81.9 | 80.2 |
| Isobutane-isopentane (1:1 mole ratio) | 87.9 | 92.3 |

In the run employing the mixture of isobutane and isopentane as the feed stock, the relative proportions of isobutane and isopentane reacting to produce alkylate were determined in the following manner. The feed stock and the reaction product were each carefully analyzed for isobutane and isopentane content, according to the method of Podbielniak. In this way, the quantities of isobutane and isopentane which were consumed in the course of the reaction were determined. It was also determined independently that when isopentane alone is alkylated with pentylenes under the same conditions, isobutane is actually produced in the average quantity of 0.3 mole of isobutane per mole of isopentane reacted. Allowance was made for this production of isobutane in calculating the quantity of isobutane reacting to produce alkylate, according to the procedure hereinbefore described. In this manner, it was found that, in the run described above, using a mixed isoparaffinic feed, isobutane and isopentane were actually consumed in the reaction to produce alkylate in the ratio of 0.67:1, or two parts of isobutane to three parts of isopentane. The alkylates produced from the isobutane and isopentane individually were blended together in the above ratio of production. An inspection of the IBP—320° F. fraction of this blend after depentanization showed an ASTM octane number of 85.6. This fraction constituted 85.4 volume per cent of the total blend. These data compare unfavorably with the ASTM octane number of 87.9 and the volume per cent of total alkylate of 92.3 shown above for the alkylation run employing the mixed isoparaffinic feed stock.

While the isobutane and isopentane were present in equal molar concentration in the run described above, it is not to be assumed that this ratio is essential to obtaining an improved result over the alkylation of these isoparaffins individually. In any case to obtain the particular desirable feature disclosed herein the proportion of isopentane should not be less than about 30% of the total isoparaffinic feed. When smaller amounts of isopentane are employed, the olefins tend to react with the isobutane to the exclusion of the isopentane. An excess of isopentane over isobutane within certain limits is desirable. For example, three parts of isopentane to two parts of isobutane makes a very satisfactory isoparaffinic feed. If the isopentane constitutes more than 70% of the isoparaffinic feed, the quality of the product suffers.

The nature and objects of the present invention having been thus described and illustrated, what is claimed as new and useful and is desired to be secured by Letters Patent is:

1. A process for alkylating isoparaffins with olefins in the presence of a suitable catalyst which includes the step of charging an isoparaffinic feed comprising two isoparaffins having a different number of carbon atoms in their molecules in which neither isoparaffin constitutes less than 30 mole per cent of the total isoparaffinic feed.

2. A process according to claim 1 in which the isoparaffins are isobutane and isopentane.

3. A process for alkylating isopentane with an olefin in the presence of a suitable catalyst which includes the step of adding to the isopentane a substantially equal molar amount of isobutane.

GILMORE T. GWIN.